(12) United States Patent
Leidig

(10) Patent No.: US 6,388,819 B1
(45) Date of Patent: May 14, 2002

(54) HIGH NUMERICAL APERTURE OBJECTIVE LENS ASSEMBLY

(75) Inventor: Carl F. Leidig, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/759,964

(22) Filed: Jan. 12, 2001

(51) Int. Cl.[7] .................. G02B 13/18; G02B 21/02; G02B 9/34
(52) U.S. Cl. .................. 359/716; 359/661; 359/784
(58) Field of Search .................. 359/656–661, 359/716, 784

(56) References Cited

U.S. PATENT DOCUMENTS

| | | | |
|---|---|---|---|
| 4,128,304 A | * | 12/1978 | Sussman .................. 359/716 |
| 4,139,267 A | * | 2/1979 | Minoura .................. 359/716 |
| 4,418,988 A | | 12/1983 | Sussman |
| 4,595,264 A | | 6/1986 | Nakamura |
| 4,671,623 A | | 6/1987 | Chikuma |
| 6,075,656 A | | 6/2000 | Bietry et al. |

OTHER PUBLICATIONS

"A Rewritable Optial Disk System with over 10 GB of Capacity", by Kiyoshi Osato, pp. 131–133.

"Microscope Objectives and their Evolution to Optical Disk Objectives", by Barry G. Broome, Presented at the SPIE Annual Meeting, Los Angeles, CA, Jan. 1992.

* cited by examiner

Primary Examiner—Scott J. Sugarman
(74) Attorney, Agent, or Firm—Raymond L. Owens

(57) ABSTRACT

A high numerical aperture objective lens assembly for focusing light includes a first objective lens assembly element of negative optical power intercepting said light; a second objective lens assembly element of positive optical power disposed adjacent to said first objective lens assembly element; a third objective lens assembly element of positive optical power disposed adjacent to said second objective lens assembly element; and wherein said first, second, and third objective lens assembly elements, in combination, include six surfaces wherein three or more of such surfaces are aspheric surfaces arranged so that the objective lens assembly has a numerical aperture equal to or greater than 0.65.

15 Claims, 3 Drawing Sheets

HIGH NUMERICAL APERTURE OBJECTIVE LENS ASSEMBLY

FIELD OF THE INVENTION

The present invention relates to objective lens assembly with high numerical apertures and a large angular field.

BACKGROUND OF THE INVENTION

An objective lens assembly is used for imaging optical radiant energy on an optically sensitive medium at high recording density, or for reading information on medium in the image space. Image space refers to the short or near conjugate space of the objective lens assembly.

For practical use with monochromatic or quasi-monochromatic light of a wavelength ranging from the ultraviolet to the near infrared, high resolving power requires an objective lens assembly numerical aperture (NA) typically of 0.55 or greater.

Objective lens assemblies of high numerical aperture for recording and reading a single channel or stream of data on optically sensitive medium are well known in the art, such as can be found with writable/readable compact disks (CD) and digital versatile disks (DVD). If the image space is in air (n=1), the greatest theoretically achievable NA is 1. Single element objective lens assemblies that utilize aspheric surfaces and high index of refraction glasses can achieve numerical apertures of approximately 0.55. However, when the numerical aperture becomes larger than 0.55, optical aberration introduced by the objective lens assembly element become too great for the objective lens assembly to be usable at such numerical apertures. Because of this problem, objective lens assemblies with high numerical apertures (i.e., numerical apertures greater than 0.55) are constructed of two or more objective lens assembly elements.

Also, focus adjustment is effected in most optical recorders by the use of a driving mechanism that moves the objective lens assembly longitudinally. Due to the high NA of the objective lens assemblies used in the current art, working distance, i.e., the separation from the last objective lens assembly surface to the optically sensitive medium, is usually very small. Small working distances place limits on the maximum accommodation for objective lens assembly focus adjustment.

A large working distance is not only desirable for focus adjustment but also to avoid objective lens assembly interference with debris attached to the medium or inadvertent scratching of the medium by the objective lens assembly.

Two element high numerical aperture objective lens assemblies have been shown to produce numerical apertures of over 0.7 and approaching 0.9. Such a high numerical aperture objective lens assembly is disclosed in the article entitled "A Rewritable Optical Disk System with Over 10 GB of Capacity" by Kiyoshi Osato, Kenji Yamamoto, Isao Ichimura, Fumisada Macda and Yutaka Kasami. However, the correction of objective lens assembly aberration such as coma and astigmatism away from the objective lens assembly optical axis is usually insufficient to permit high density recording and reading at any position other than near the objective lens assembly optical axis at best focus. Usually only a single channel is recorded and read at the axial position where aberrations are small and field aberrations non-existent.

The application of an aspheric surface to one or more surfaces of single and two-objective lens assembly-element objective lens assemblies for optical recording type devices is also well known in the art. Specifically, U.S. Pat. Nos. 4,595,264, 4,671,623, and 6,075,656 disclose some such objective lens assemblies employing one or more aspheric surfaces. Generally, as aspheric surfaces are added to a design, the theoretical performance of the design increases. Although the use of aspheric objective lens assembly surfaces facilitate the theoretical aberration-correction properties in optical designs like the aforementioned optical objectives, in practical applications, it is desirable to limit the number of aspheric surfaces due to objective lens assembly element manufacturing sensitivities and assembly complexities. Specifically, if more than two aspheric surfaces are used in a two element design, one of the objective lens assembly elements must be a bi-aspheric, i.e., both surfaces of at least one of the objective lens assembly elements are aspheric. Fabrication of bi-aspheric objective lens assembly elements are often difficult because the two-aspheric halves must be very accurately aligned; even small decentrations on the order of a few microns will can cause deleterious degradation of the optical design performance.

Decentrations for the manufacture of aspheric objective lens assembly elements should allow several microns. Similarly, decentration of one aspheric objective lens assembly element with respect to another objective lens assembly element during assembly can also cause rapid degradation in image quality. Sensitively of this type is alluded to in the aforementioned article by Kiyoshi Osato et al. For the best manufacturable designs, these sensitivities must be minimized and accounted for. For two-element objective lens assembly designs that require three or four aspheric surfaces to achieve some target levels of performance, options for desensitizing the design to the aforementioned objective lens assembly element and manufacturing sensitivities are limited.

Objective lens assemblies are also known in the art, especially in the field of microscopy, that overcome some of the aforementioned deficiencies. Such an objective lens assembly is found in U.S. Pat. No. 4,418,988. These objective lens assemblies may have high numerical apertures and aberration-correction over finite field angles and typically possess larger working distances than those objective lens assemblies used in the optical recording field. However, these objective lens assemblies have limited applicability to the field of optical recording because of their large size and mass; large objective lens assemblies are not conducive for quick movement to accommodate rapid refocusing by a drive mechanism. Additionally, these objective lens assemblies often contain many more objective lens assembly elements and surfaces that make manufacturing difficult and expensive. Specific lens design examples illustrating the close relationship of microscopy lenses and optical recording lenses are found in the article "Microscope Objectives and Their Evolution to Optical Disk Objectives", presented by Barry G. Broome of Optical Research Associates, and found in the proceedings of the SPIE Annual Meeting, January, 1992.

Presently, it is believed that there are no commercially available lens assemblies that meet the requirement of having a 0.65 or greater numerical aperture, large field, long working distance, and light mass.

SUMMARY OF THE INVENTION

It is therefore an object of the present invention to provide an optical objective lens assembly for focusing light that has a diffraction-limited high numerical aperture of at least 0.65, a large angular field, and a large working distance of at least 0.25 mm.

It is another object of the present invention to provide an optical objective lens assembly having a mass of less than 1 gram, and which is relatively easy to manufacture.

These objects are achieved by a high numerical aperture objective lens assembly for focusing light, comprising:

a) a first objective lens assembly element of negative optical power intercepting said light;

b) a second objective lens assembly element of positive optical power disposed adjacent to said first objective lens assembly element;

c) a third objective lens assembly element of positive optical power disposed adjacent to said second objective lens assembly element; and d) wherein said first, second, and third objective lens assembly elements, in combination, include six surfaces wherein three or more of such surfaces are aspheric surfaces arranged so that the objective lens assembly has a numerical aperture equal to or greater than 0.65.

The present invention is particularly suitable for use in optical recording and readout systems since it is relatively easy to manufacture, has a low mass and, quite importantly, has a numerical aperture equal to or greater than 0.65. Moreover, the present invention provides for a large field and long working distance.

DETAILED DESCRIPTION OF THE INVENTION

Figure 1:
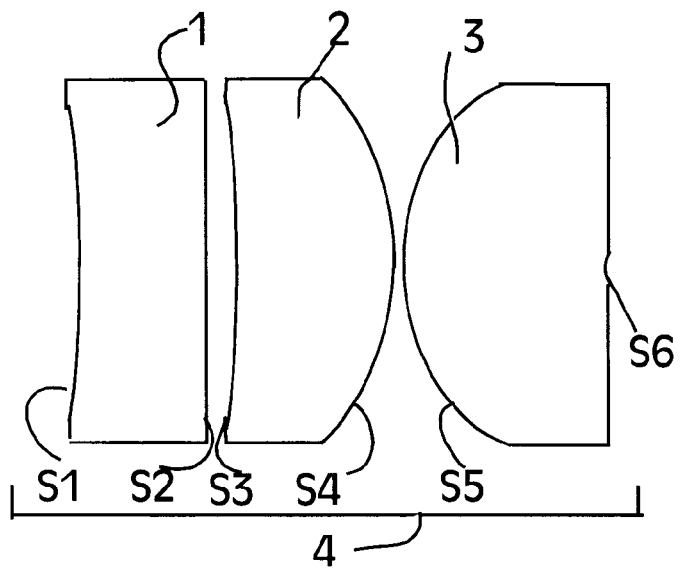
FIG. 1 illustrates the arrangement of objective lens assembly elements used in a high numerical aperture objective lens assembly with a wide angular field according to the present invention.

Turning now to FIG. 1, a high numerical objective lens assembly for focusing light 4 is shown to have three objective lens assembly elements 1, 2 and 3. Objective lens assembly elements 1, 2 and 3 are all spaced apart and disposed close to one another, and in combination, provide the objective lens assembly 4 with a numerical aperture equal to or greater than 0.65. The numerical aperture (NA) of an objective lens assembly is defined as NA=n sin(θ) where n is the index of refraction of the image space and θ is the angle of the marginal ray (the highest ray entering the objective lens assembly) at the image space. Image space refers to the short or near conjugate space of the objective lens assembly. Specifically, an objective lens assembly according to the present invention includes, in succession from the farther conjugate point side of the objective lens assembly towards the nearer conjugate point side, first objective lens assembly element 1 of negative optical power intercepting light from the farther conjugate point side, second objective lens assembly element 2 of positive optical power disposed adjacent to said first objective lens assembly element 1, and third objective lens assembly element 3 of positive optical power disposed adjacent to the second objective lens assembly element 2. The first, second, and third assembly lens elements 1–3 include the six surfaces S1–S6 and, when three or more of such surfaces are aspheric, the optical lens assembly can be arranged to have a numerical aperture equal to or greater than 0.65.

It is preferred that the index of refraction of each of the objective lens assembly element materials be 1.7 or higher. The higher indices of refraction generally permit the surface curvatures of the individual surfaces of the objective lens assembly elements 1–3 to be weaker than they otherwise would be. Weaker curvatures are often easier to fabricate and test than stronger curvatures. However, if the objective lens is used with other than monochromatic light, reducing axial color may be more important than selecting high index of refraction materials. Axial color is defined as the longitudinal separation of the best focus position of different wavelengths of light. V-number, often shortened in the optical literature to V/#, is defined as $V/\# = (N\lambda_2 - 1)/(N\lambda_1 - N\lambda_3)$ where $N\lambda_1$, $N\lambda_2$, $N\lambda_3$, are respectively the indices of refraction at the respective wavelengths $\lambda$, where $\lambda_3 > \lambda_2 > \lambda_1$. Dispersion is defined as the reciprocal of V/#. If reducing axial color is important, then the first objective lens assembly element 1 should be formed of a material that has an optical dispersion less than either of the second objective lens assembly element 2 or the third objective lens assembly element 3. Selecting the first objective lens assembly element 1 with a lower dispersion is desirable because it has the greatest influence on reducing axial color. If the lens collection 4 of the objective lens assembly elements 1–3 are used exclusively with a single monochromatic wavelength, then it remains preferable to use high index of refraction glass throughout without regard to V/#.

The lens collection 4 is illustrated in FIG. 1 and its parameters are provided in Tables 1A, 1B, and 1C. In these tables N is the index of refraction of the objective lens assembly element materials, and all linear dimensions except for the wavelength $\lambda_i$ are provided in millimeters.

In the following Tables 1A and 1B, the six surfaces S1–S6 for the various lenses are shown clearly in FIG. 1.

TABLE 1A

Optical Surface Prescription for a High Numerical Aperture Lens Assembly

| Surface | Radius | Spacing | Material |
|---------|--------|---------|----------|
| Object  | —      | Infinity | Air |
| S0      | Aperture Stop | 0.495 | Air |
| S1 asphere | −14.6595365 | 2.638 | FK5 |
| S2      | Plano  | 0.367 | Air |
| S3 asphere | −16.0597189 | 3.180 | TAC4 |
| S4 asphere | −3.9349971 | 0.100 | Air |
| S5      | 2.4094733 | 3.585 | TAC4 |
| S6      | 4.6414644 | 0.340 | Air |
| Image   | —      |       |       |

NA = 0.7
Focal length = 2.11 mm
Reference wavelength = 850 nm

TABLE 1B

Aspheric Surface Parameters for the Aspheric Surfaces of the Lens of Table 1A

| Surf | K | AD | AE | AF | AG |
|---|---|---|---|---|---|
| S1 | 0 | −.7475155e−2 | −.7029977e−3 | .6859338e−4 | .4018488e−5 |
| S3 | −16.57429 | 0 | 0 | 0 | 0 |
| S4 | .4620943 | .3339603e−2 | .1153488e−3 | .7766729e−5 | .2374434e−5 |

TABLE 1C

Material Refractive Indices for the Lens of Table 1A

| Wavelength | $\lambda_1$ = 780 nm | $\lambda_2$ = 815 nm | $\lambda_3$ = 850 nm | V/# |
|---|---|---|---|---|
| N (FK5) | 1.47939906 | 1.47878043 | 1.47820809 | 402.00 |
| N (TAC4) | 1.71827951 | 1.71710111 | 1.71602027 | 317.41 | where V/#=$(N\lambda_2-1)/(N\lambda_1-N\lambda_3)$ $N\lambda_1$, $N\lambda_2$, $N\lambda_3$, are the indices of refraction at the respective wavelengths $\lambda_i$, where $\lambda_3 > \lambda_2 > \lambda_1$ The surface S1 of the first objective lens assembly element 1 that faces away from the second objective lens assembly element 2 is concave, and the surface S2 disposed adjacent to the second objective lens assembly element is planar. The planar surface S2 makes the objective lens assembly element inexpensive to manufacture because the centers of the two surfaces S1 and S2 do not have to be aligned. The surfaces S1, S3, and S4 are aspheric. The aspheric equation is:

$$X = \frac{CY^2}{1 + (1 - (K+1)C^2))^{0.5}} + ADY^4 + AEY^6 + AFY^8 + AGY^{10} + \cdots$$

where

X is the distance along the optical axis OA;

Y is the height from the optical axis;

C is the reciprocal of the vertex radius of curvature of the curved objective lens assembly surface;

K is the conic coefficient;

AD through AG . . . are aspheric coefficients of the $4^{th}$, $6^{th}$, $8^{th}$, $10^{th}$, etc. order. The value of the aspheric coefficients for the aspheric surfaces S1, S3, and S4 are provided in Table 1B.

The asphericity of surfaces S1, S3, and S4 is primarily used to correct spherical aberration and to reduce field distortion. The performance of the high numerical aperture objective lens assembly is given in Table 1D.

TABLE 1D

Quasi-monochromatic Strehl Ratio Focal Corridors for the Lens of Table 1A

| Wavelength | 848.5 | 850.0 | 851.5 |
|---|---|---|---|
| Wavelength mass | 1 | 1 | 1 |
| Depth of focus for composite field of +/− 2.0 degrees: 1.23 microns; Strehl ratio > 0.80 | | | |
| Wavelength | 779.7 nm | 780.0 nm | 780.3 nm |

TABLE 1D-continued

Quasi-monochromatic Strehl Ratio Focal Corridors for the Lens of Table 1A

| Wavelength mass | 1 | 1 | 1 |
|---|---|---|---|
| Depth of focus for composite field of +/− 2.0 degrees: 1.13 microns; Strehl ratio > 0.80 | | | |

More specifically, Table 1D lists the quasi-monochromatic Strehl ratio diffraction-limited focal corridor. The Strehl ratio is the illumination at the center of the Airy disk for an aberrated system expressed as a fraction of the corresponding illumination for a perfect system. Typically, optical systems with Strehl ratios greater than about 0.8 are considered diffraction-limited. For well corrected systems where the Strehl ratio exceeds approximately 0.8, there is a well known relationship between the wavefront of the root-mean-square optical-path-difference (RMS-OPD) and Strehl ratio:

$$\text{Strehl ratio} = (1 - 2\pi^2\omega^2)^2$$

where $\omega$ - root-mean-square optical-path-difference. This indicates that the RMS-OPD difference is less than about 0.075 and is diffraction-limited.

Figure 2:
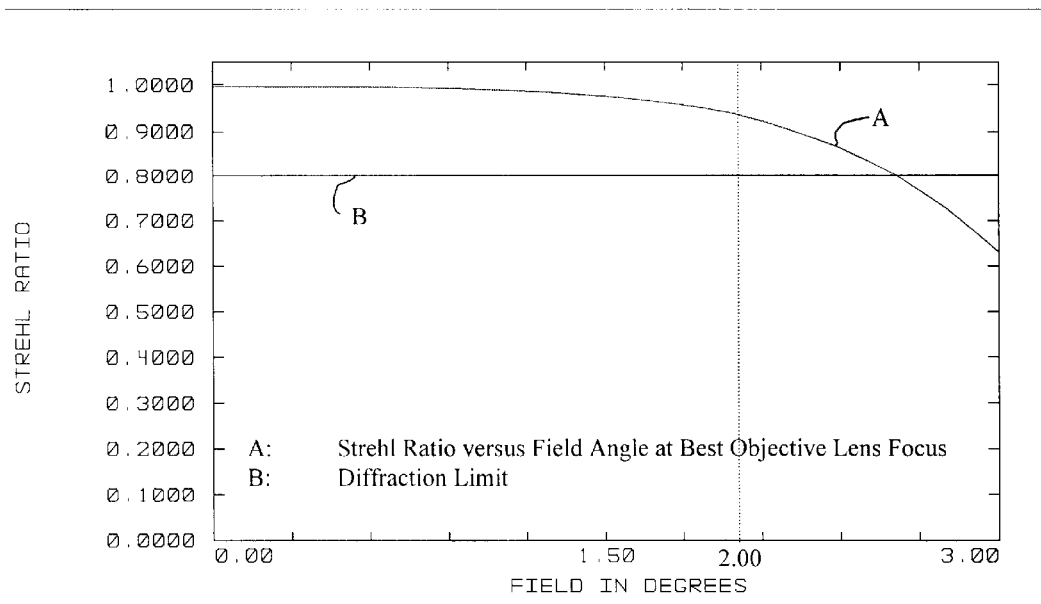
FIG. 2 is a plot of Strehl ratio versus semi-angular field in degrees for the high numerical aperture objective lens assembly of FIG. 1 when used at 850 nanometers.
Figure 3:
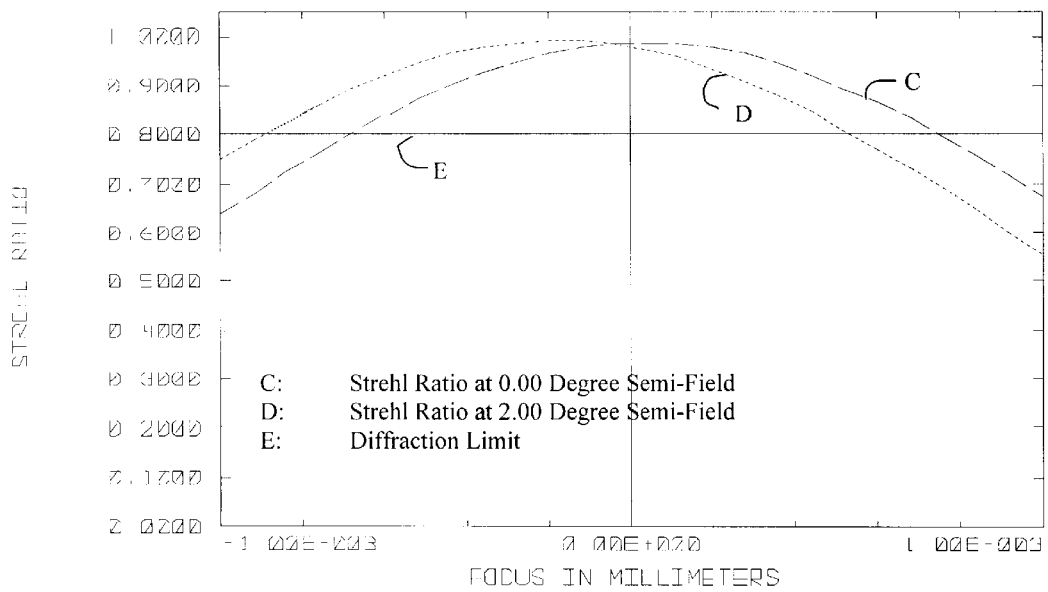
FIG. 3 is a plot of Strehl ratio versus focus in millimeters for the high numerical aperture objective lens assembly of FIG. 1 when used at 850 nanometers.

The performance of this lens collection 4 described in Tables 1A–1D at a numerical aperture of 0.7 is excellent; the objective lens assembly has a diffraction-limited semi-angular field of at least two degrees. The excellent performance of the objective lens assembly is supported by FIGS. 2 and 3 which illustrate the Strehl ratio versus semi-field angle at best focus, and the Strehl ratio versus focus at 850 nanometers, respectively. The surface of the third objective lens assembly element 3 that faces away from the second objective lens assembly element is concave. The concave surface S6 of the third objective lens assembly element 3 helps to flatten the optical field and to provide a diffraction-limited semi-angular field of at least two degrees.

Objective lens assembly elements 2 and 3 are made from optically transparent glass TAC4 and objective lens assembly element 1 is made from optically transparent glass FK5. These glasses transmit visible as well as near infrared light (700–1300 nm). Therefore, lens collection 4 would be suitable (with slight change in the surface profiles) for use with monochromatic light at these wavelengths. Although these objective lens assembly elements are made with glass, they do not have to be. Alternatively they could be made of plastic or some could be made of glass and others of plastic. However, glass can have higher indices of refraction than most typical plastics, and as previously discussed, higher material indices of refraction are a desirable property. Additionally, plastics exhibit greater changes than glass to temperature (i.e., size and refractive indices). For these reasons, glass is usually the preferable objective lens assembly element material choice.

Objective lens assembly elements 1 and 2 with aspheric surfaces S1, S3, and S4 are usually difficult to fabricate using conventional grinding and polishing techniques. For this reason, objective lens assembly elements 1 and 2 can be made using high temperature glass molding techniques. The third objective lens assembly element 3 has spherical surfaces. Having all spherical surfaces on the third objective lens assembly element 3 is considered preferable because surface S5 has the most curvature and surface S6 has the smallest aperture size (i.e., aperture size being the surface area through which the optical energy passes). Fabricating and measuring aspheric departures on surfaces S5 and S6 would be more difficult than the surfaces upon which the aspheres are placed (S1, S3 and S4). Also, lenses with only spherical surfaces can be produced by grinding and polishing techniques that may be less expensive than the techniques used to produce aspheric surfaces; however, this objective lens assembly element can be molded.

Figure 4:
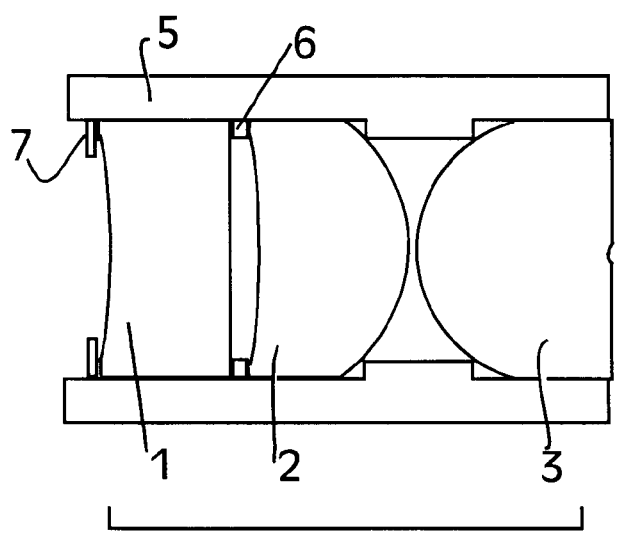
FIG. 4 illustrates, in more detail than FIG. 1, the objective lens assembly.

FIG. 4 is an illustration of how the objective lens assembly elements 1–3 can be mounted. Because a low objective lens assembly mass and small size are important to reducing the load to the driving device, a mounting structure of small overall width and length is desired. FIG. 4 is an illustration of such a compact mount. Mounting barrel 5 is used to contain and center the objective lens assembly elements 1, 2, and 3. Spacer 6 is used to establish an appropriate airspace between objective lens assembly elements 1 and 2. An aperture-stop 7 establishes the appropriate aperture to give the lens collection 4 an NA equal to about 0.7. For the objective lens assembly described in Tables 1A–D with an NA equal to about 0.7, the outside diameter of the mounting barrel 5 can be kept under 6.00 mm and preferably as little as 5.0 mm. The total objective lens assembly length can be kept under 11 mm.

In FIG. 4, the lens collection 4 along with mounting barrel 5 has a nominal outside diameter of 5.0 mm and nominal length of 10.76 mm. If the mounting barrel 5, spacer 6, and aperture-stop 7 are made of brass, and the objective lens assemblies 1, 2, and 3 are made of the glass types specified in Table 1C, the total mass of the objective lens assembly will be about 0.9 grains. If aluminum is substituted for the metallic portions of objective lens assembly, the total mass will be about 0.6 grams. The objective lens assembly can have a total mass less than one gram. Aluminum is a preferred mounting material because of its light mass; however, any material that can be machined to very precise dimensions could be substituted.

Figure 5:
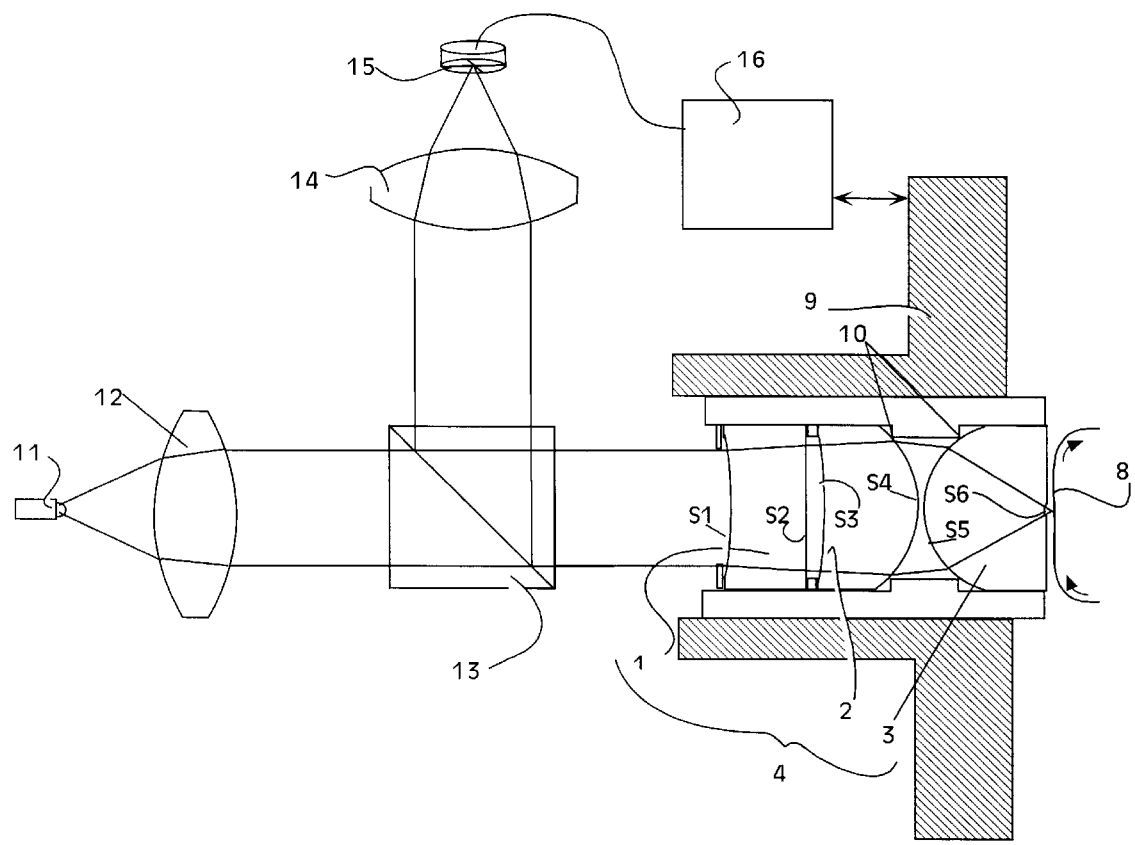
FIG. 5 is a schematic of an optical system that utilizes the high numerical aperture objective lens assembly of FIG. 4 for optical recording.

FIG. 5 illustrates the use of the high numerical aperture objective lens assembly according to the present invention. A desirable feature of the way the lens collection 4 functions is the relatively long working distance between the last surface S6 of objective lens assembly 3 and of image plane 8. Working distance is defined as the longitudinal separation from the last physical surface of an objective lens assembly and the focused image plane 8. This large distance helps assure that no inadvertent contact between the objective lens assembly 4 and the image plane 8 will occur during the operation of the focus driving mechanism 9. Additionally, the large working distance assures that undesirable debris particles that may adhere to the image plane 8 will pass freely beneath the objective lens assembly. The working distance for the lens collection 4 along with mounting barrel 5 exceeds 0.25 mm. The use of the first objective lens assembly element 1 of negative optical power is important in achieving the long working distance.

Alignment of the objective lens assembly elements 1, 2, and 3 by the mounting barrel 5 is facilitated by the relatively large edges of those elements. Alternatively, these objective lens assembly elements can be described as having low aspect ratios. The aspect ratio is defined as the ratio of the diameter to the thickness of an objective assembly lens element. Because the objective lens assembly elements have low aspect ratios and the mounting barrel has an inside diameter only slightly larger than each of the diameters of objective assembly lens element 1–3, the propensity for the individual objective assembly lens elements to roll or slide within the assembly is reduced. The ratio of the diameters of each of the objective lens assembly elements to their respective thicknesses should not exceed 2.0. The objective lens assembly elements 1, 2 and 3 possess aspect ratios of less than 1.8, 1.5 and 1.3, respectively.

Alignment (centering) of objective lens assembly elements 2 and 3 is facilitated because the second and third assembly elements are seated within the objective lens assembly mounting barrel 5. Seats 10 are machined into the mounting barrel 5 and the facing surfaces of the second and third objective lens assembly elements are convex and spaced apart by those seats 10. The seats 10 are actually edges, usually in the shape of a circle in rotationally symmetric geometry, upon which a lens element with curvature makes contact. The mechanical registration of the curvatures of objective lens assembly elements 2 and 3 are facilitated by placing the lens assembly elements 2 and 3 against the seats. For rotationally symmetric lenses, registration is the alignment of the centers-of-curvature of the various lens elements including the lens assembly along a single imaginary line termed the optical axis of the lens collection 4. Along with the low aspect ratios of objective lens assembly elements 2 and 3, the mounting seats 10 help establish an accurate alignment along the optical axis for the objective lens assembly surfaces S3, S4, S5, and S6.

Objective lens assembly element 1, however, has no mounting barrel seat to facilitate alignment of SI with respect to surfaces S3, S4, S5 and S6 along a common optical axis. Alignment of objective lens assembly element 1 relies on either the tight dimensions between the mounting barrel 5 and objective lens assembly element 1 for a passive alignment or on an active positioning of objective lens assembly element 1 by sliding it (moving it laterally side-to-side) within the mounting barrel 5. The choice of making objective lens assembly surface S2 a planar (plano) surface helps make the fabrication of objective lens assembly element 1 inexpensive; also, the alignment of the centers of curvature of opposing surfaces S1 is moot because S2 has no center of curvature to be misaligned. Alternatively, an objective lens assembly in accordance with the present invention can be made with either surface S1, S2, or S3 plano and still achieve the desirable imaging and working distance properties of the objective lens assembly, however, for the preferred embodiment, it is believed preferable to choose S2 as the plano surface. The negative optical power of objective lens assembly element 1 is more effective in achieving a long working distance in the objective lens assembly when that negative power is farthest from the image plane 8. Also, choosing surface S2 as plano makes the fabrication of objective lens assembly element 1 inexpensive, and objective lens assembly element 1 can, if desired, be actively moved until the center of curvature of surface S1 aligns with the objective lens assembly optical axis.

Because the objective lens assembly includes at least three aspheric surfaces out of six total surfaces S1–S6, and because surface S2 of objective lens assembly element 1 is preferably planar, and because both surfaces S5 and S6 of objective lens assembly element 3 are preferably spherical, the second objective lens assembly element 2 is bi-aspheric. Additionally, to help reduce the manufacturing sensitivity of the lateral alignment of objective lens assembly element 1 to objective lens assembly element two, it is desirable to limit the amount of refraction (or bending) of the marginal or outermost ray of light 11a (see FIG. 5) at the surfaces of objective lens assembly elements 1 and 2 enclosing the first airspace. By minimizing this bending, the propensity for deleterious optical aberrations to be introduced by the slight lateral misalignment of these two surfaces is lessened. As shown, the first optical assembly element 1 is spaced from the second optical assembly element 2 and a marginal ray of light 11a makes an angle with respect to the path of the marginal ray in the first optical assembly element 1 and the path of the marginal ray between the first and second optical assembly elements of no greater than four degrees.

The marginal ray of light 11a makes an angle with respect to the path of the marginal ray between the first and second optical assembly elements and in the second optical assembly element of no greater than four degrees.

For the lens described in Tables 1A, 1B, and 1C, the angular difference of the marginal rays at each of the surfaces of the first and second optical assembly elements is less than two degrees.

Returning once more to FIG. 5 an objective lens assembly is shown used in a recording and/or reading device. The flux of light radiated from the semi-conductor laser 11 is made almost parallel with the use of a collimator lens 12. The collimated flux of light passes through a beamsplitter 13 and is collected by the objective lens assembly. The radiant energy is focused by the objective lens assembly onto the recording medium. Additionally, if multiple sources of radiant energy are used, several independent spots of light can be focused on the image plane 8 which will be defined by a recording; the relatively large field of the collimator lens 12 of the present invention permits many such spots to be imaged over the field. Some percentage of light incident on the recording medium is reflected by the signal recording surface, passes through the lens collection 4, and is partially reflected by the beamsplitter 13 into a light path directed towards another light collecting lens 14. The light collecting lens 14 focuses the energy reflected from the image plane 8 onto a detector 15. The optical detector 15 outputs a signal in accord with both the lateral and longitudinal position of the flux incident on the recording medium and outputs a signal to a processing device 16. The output signal may include control-error (like focus error) and tracking error signals. The focus error signal is the signal showing the change in distance, in the direction of the optical axis, that would optimize the focus of the objective lens assembly with respect to the image plane 8. Similarly, the tracking signal is the signal showing the change in the lateral (right angle with respect to the optical axis) dimension that would optimize the correct positioning of the focus on the optical recording medium disposed at the image plane 8. These control error signals are transmitted to the drive mechanism 9, which can be embodied by an actuator. The drive mechanism 9 supports the lens collection 4 and positions the lens collection 4 for optimum reading/recording based on each control error signal.

The invention has been described in detail with particular reference to certain preferred embodiments thereof, but it will be understood that variations and modifications can be effected within the spirit and scope of the invention.

| PARTS LIST | |
|---|---|
| 1 | objective lens assembly element |
| 2 | objective lens assembly element |
| 3 | objective lens assembly element |
| 4 | objective lens assembly |
| S1–S6 | surfaces |
| 5 | mounting barrel |
| 6 | spacer |
| 7 | aperture-stop |
| 8 | image plane |
| 9 | drive mechanism |
| 10 | mounting seats |
| 11 | semi-conductor laser |
| 11a | marginal or outermost ray of light |
| 12 | collimator lens |
| 13 | beamsplitter |
| 14 | light collecting lens |
| 15 | optical detector |
| 16 | processing device |

What is claimed is:

1. A high numerical aperture objective lens assembly for focusing light, comprising:
   a) a first objective lens assembly element of negative optical power intercepting said light;
   b) a second objective lens assembly element of positive optical power disposed adjacent to said first objective lens assembly element;
   c) a third objective lens assembly element of positive optical power disposed adjacent to said second objective lens assembly element; and
   d) wherein said first, second, and third objective lens assembly elements, in combination, include six surfaces wherein three or more of such surfaces are aspheric surfaces arranged so that the objective lens assembly has a numerical aperture equal to or greater than 0.65.

2. The objective lens assembly of claim 1 further including a objective lens assembly mount wherein the second and third objective lens assembly elements are seated.

3. The objective lens assembly of claim 1 that has a diffraction-limited semi-angular field of at least two degrees.

4. The objective lens assembly of claim 1 wherein the first optical assembly element is spaced from the second optical assembly element and a marginal ray of light makes an angle with respect to the path of the marginal ray in the first optical assembly element and the path of the marginal ray between the first and second optical assembly elements of no greater than four degrees.

5. The objective lens assembly of claim 4 wherein the marginal ray of light makes an angle with respect to the path of the marginal ray between the first and second optical assembly elements and in the second optical assembly element of no greater than four degrees.

6. The objective lens assembly of claim 1 wherein the second objective lens assembly element is bi-aspheric and the third objective lens assembly element has spherical surfaces.

7. The objective lens assembly of claim 1 wherein the surface of the first objective lens assembly element that faces away from the second objective lens assembly element is concave.

8. The objective lens assembly of claim 1 wherein the surface of the third objective lens assembly element that faces away from the second objective lens assembly element is concave.

9. The objective lens assembly of claim 1 wherein the facing surfaces of the second and third objective lens assembly elements are convex and spaced apart.

10. The objective lens assembly of claim 1 wherein the first objective lens assembly element is formed of a material has an optical dispersion less than either of the second objective lens assembly element or the third objective lens assembly element.

11. The objective lens assembly of claim 1 wherein the first objective lens assembly element has a planar surface disposed adjacent to the second objective lens assembly element.

12. The objective lens assembly of claim 1 wherein the ratio of the diameters of each of the objective lens assembly elements to their respective thicknesses does not exceed 2.0.

13. The objective lens assembly of claim 1 wherein the working distance exceeds 0.25 millimeters.

14. The objective lens assembly of claim 2 having a total mass less than one gram.

15. An optical recording or reading device, comprising:
 a) a source of light; and
 b) an optical lens assembly for focusing light on a surface for reading or recording including:
  i) a first objective lens assembly element of negative optical power intercepting said light;
  ii) a second objective lens assembly element of positive optical power disposed adjacent to said first objective lens assembly element;
  iii) a third objective lens assembly element of positive optical power disposed adjacent to said second objective lens assembly element; and
  iv) wherein said first, second, and third objective lens assembly elements, in combination, include six surfaces wherein three or more of such surfaces are aspheric surfaces arranged so that the objective lens assembly has a numerical aperture equal to or greater than 0.65.

\* \* \* \* \*